March 10, 1942. L. SHUGER 2,275,596
POLISH
Filed Sept. 15, 1938
Fig. 1.
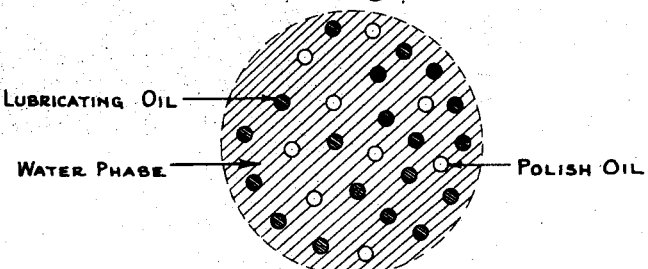
Fig. 2.
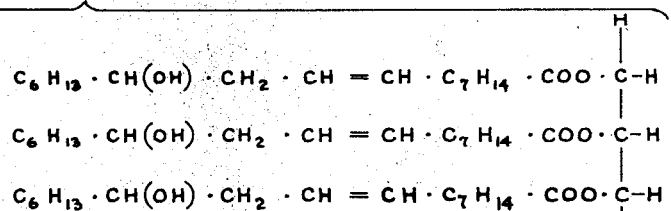
Fig. 3.
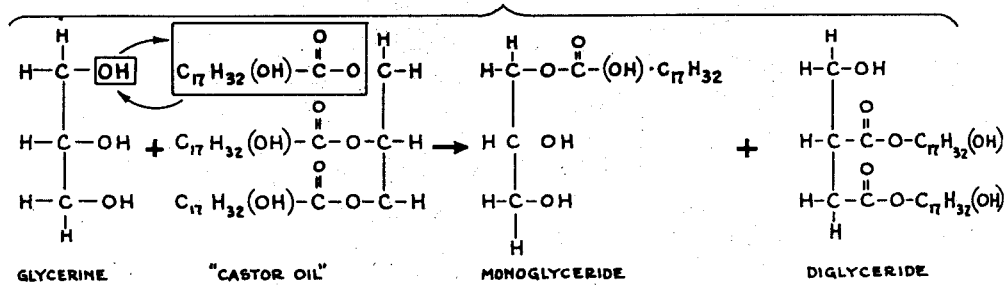
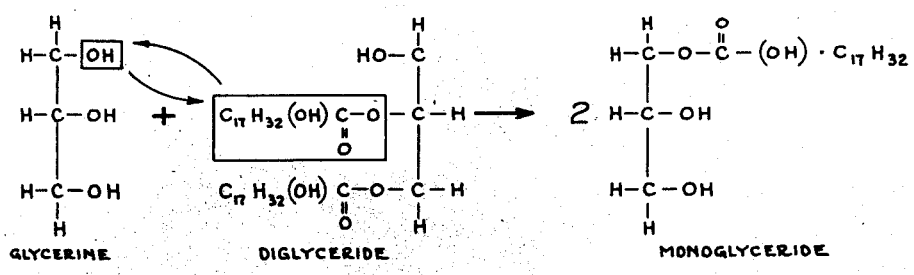
Fig. 4.
Inventor
Leroy Shuger
By Karl W. Flocks
Attorney Patented Mar. 10, 1942

2,275,596

UNITED STATES PATENT OFFICE 2,275,596

POLISH

Leroy W. Shuger, Baltimore, Md., assignor to Baltimore Paint & Color Works, Inc., Baltimore, Md., a corporation of Maryland Application September 15, 1938, Serial No. 230,129

3 Claims. (Cl. 106—9)

This invention relates to polishes and their ingredients and more particularly to polishing compositions particularly adapted for use in connection with the polishing of automobiles, furniture, floors, and generally for the cleaning and restoring of the lustre of varnished, enameled, lacquered, Bakelite, and other surfaces.

Prior to the instant invention the advantages of three-phase emulsion polishes have been appreciated, wherein a polishing base medium such as an animal, vegetable, or fish oil; a fat; a wax; or a resin or their equivalents is one distinct dispersed phase, a petroleum hydrocarbon, such as a mineral oil, is the second distinct dispersed phase, and water, or some aqueous solution, is the third phase which is continuous. An example of this type of emulsion polish is found in the specification of my Patent No. 2,081,073 wherein raw castor oil is one dispersed phase, mineral oil is a second dispersed phase and water is the continuous phase. While other oils corresponding to castor oil which are immiscible with petroleum hydrocarbons such as mineral oil and further immiscible with water, may be utilized in the making of three-phase emulsion polishes, such oils are not as commercially available as raw castor oil and slightly modified forms of raw castor oil, such as pale blown castor oil. Why a two-phase emulsion polish including oils, waxes, resins or their equivalents which are miscible with petroleum hydrocarbons such as mineral oil, produce a hazy appearance and a polish of a greasy nature and poor durability, is set forth in my aforementioned Patent No. 2,081,073.

It is an object of this invention to teach the method of making a three-phase emulsion polish of improved characteristics and to provide such improved polish.

It is a further object of this invention to teach the altering of characteristics of ingredients which would normally make a relatively poor polish, in order that an improved polish may result.

Other objects and the nature and advantages of the invention will be apparent from the following description taken in conjunction with the accompanying drawing, wherein:

Fig. 1 is a diagrammatic representation of a three-phase emulsion polish;

Fig. 2 is the structural formula of triricinolein which may be considered for purposes of this specification as the formula for castor oil;

Fig. 3 is a structural representation of the reaction of glycerine and castor oil to yield monoglyceride and diglyceride; and, Fig. 4 is a structural representation of the reaction of glycerine with diglyceride to form monoglyceride.

Referring to Fig. 1, a polish comprising an emulsion having three phases is schematicaly illustrated and depicts a polishing base medium as a first dispersed phase, a lubricating oil as a second dispersed phase an aqueous solution or water in a continuous phase. Polishing base medium may comprise such substances as animal, vegetable or fish oils; fats, waxes, resins or their equivalents. The lubricating oil is preferably a petroleum hydrocarbon such as mineral oil or its equivalent; the aqueous solution may comprise water in which has been dissolved some coloring matter or odiferous material, or it may simply and solely comprise water. Other substances may be added to the emulsion for various reasons, as will be later described.

As raw castor oil comprises substantially 94% triricinolein, the glyceride of ricinoleic acid, 1% dihydroxystearic acid, and 5% of glyceride less saturated than ricinoleic acid, it will be understood why the formula illustrated in Fig. 1, which is that for triricinolein, may be taken as that for castor oil in this specification.

The immiscibility of castor oil in petroleum hydrocarbons, as well as its solubility in alcohol, both of which characteristics help distinguish it from other fatty oils, is due to the presence of the hydroxyl group in the ricinoleic molecule. Fats, oils, waxes, resins, etc., which are normally miscible or relatively miscible with petroleum hydrocarbons may be made relatively immiscible therewith in accordance with the teachings of this invention and thereby provide a better polish for the purposes set forth above and for other purposes. One method of rendering relatively immiscible the fats, oils, waxes, or resins comprises the reaction of same with a hydroxylating agent which may induce the addition of a hydroxyl group which produces the characteristic immiscibility in petroleum hydrocarbons and solubility in alcohol as exemplified by the structure of castor oil illustrated in Fig. 1.

To illustrate the above theorem, reference is made to the following:

1 mol of linseed oil and 2 mols of glycerine may be refluxed together at a temperature of approximately 250° C. in the presence of sodium hydroxide, a catalyst. Conditions for stirring are provided and in an hour a homogeneous layer will be formed. This reaction may be carried to a point where the product will test as being miscible with alcohol. I prefer reacting the finished product until it tolerates 300% of its volume of methyl alcohol. The reaction which takes place may be illustrated in this manner:

1 mol linseed oil (mainly mixed or straight triglycerides of linoleic acids)
plus
2 mols glycerine
yields
mixture of mono and diglycerides of linoleic acid The mono and diglycerides thus formed contain hydroxyl groups in their structural formulas rendering the said mono and diglycerides relatively immiscible with petroleum hydrocarbons, such as mineral oil, for example. An improved three-phase polish emulsion may be thereby produced with the mono and diglycerides as one distinct dispersed phase, a petroleum hydrocarbon as a second distinct dispersed phase, and water as a third continuous phase. This emulsion in accordance with the above theorem will make a superior polish to one in which merely linseed oil takes the place of the mono and diglycerides. The quality of the polish produced is a function of the miscibility characteristics of the linseed oil, castor oil, other oil, fat or resin, as explained in my Patent No. 2,081,073.

Though linseed oil has been cited as an example, other substances such as sardine oil, olive oil, teaseed oil, coconut oil, China-wood oil, perilla oil, spermaceti wax, carnauba wax, candelilla wax, rosin, glycerol phthalate and phenolic and other resins as well as fatty acids, from which these materials are derived, and equivalents may be used in place of the linseed oil and can be hydroxylated for the purpose of rendering them immiscible with petroleum hydrocarbons in a three-phase emulsion polish.

Not only may glycerine be used as a hydroxylating substance, but polyhydric alcohols, such as ethylene glycol, diethylene glycol, trimethylene glycol, erythryol, and equivalents may be used for this purpose. As a matter of fact, any organic material which contains more than one hydroxyl group can be used, for example, sodium glycerate, sodium alcoholate, etc.

The use of sodium hydroxide during the reflux period, as explained above, is merely that of a catalyst and it is possible to perform the reaction without its presence. However, such procedure requires a much longer reaction time together with higher temperatures and more careful control. The necessary higher temperature may produce some breakdown of the oils and glycerines by organic decomposition; hence, for commercial purposes, it is more advisable to make use of the catalyst.

In place of sodium hydroxide, other alkalis, metallic hydroxides, soaps, metallic salts, or oxides can be used as a catalyst. Although varying amounts of such catalyst may be used, I prefer from .2% to 20% by weight on the basis of weight of oil or substance to be hydroxylated. With regard to the proportions of the substance to be hydroxylated and the hydroxylating agent, about ten parts of glycerine to 100 parts of oils, fats, or waxes may be used to give the desired results. Any amount of glycerine in excess of ten parts will provide a suitable hydroxylated product.

As a further example of the above theorem, natural (raw) castor oil, or a blown castor oil, such as pale blown castor oil, may have their respective characteristics improved for use as a polishing base oil in a three-phase emulsion polish by coverting these triglycerides of ricinoleic acid into the monoglycerides, diglycerides or mixtures thereof. For example:

1 mol of glycerine
plus
1 mol of castor oil
yields
1 mol monoglyceride
plus
1 mol of diglyceride The above is depicted structurally in Fig. 2.

If an additional mol of glycerine is utilized, the reaction will proceed in this manner:

2 mols glycerine
plus
1 mol of castor oil
yields
3 mols of monoglyceride

This is depicted structurally in Fig. 3. The diglyceride formed as illustrated in Fig. 2 reacts with the additional mol of glycerine to produce two additional mols of the monoglyceride.

It will be seen from the above that the ratio of glycerine to castor oil used will determine the ratio of the mono to the diglyceride formed.

In accordance with the above theorem, both the mono and diglycerides are more immiscible with petroleum hydrocarbons, such as mineral oil, than the raw or pale blown castor oil, and when utilized as the polishing base medium in a three phase emulsion polish an improved product will result.

When raw castor oil and a petroleum hydrocarbon are mixed, the miscibility, when may be relatively slight, that does occur, takes place with the castor oil layer increasing in volume by virtue of its dissolving a portion of the petroleum hydrocarbon; thus, when castor oil is mixed with mineral oil and mineral spirits in the neighborhood of the proportions illustrated in the example below, the following changes in volume take place:

Raw castor oil will increase 65% over its original volume;
Pale blown castor oil will increase 40%; and,
Glyceryl monoricinoleate will increase 35%.

This illustrates the greater immiscibility of the glyceryl monoricinoleate over the two castor oils. Furthermore, the mono and diricinoleate do not have a greasy or sticky nature and no vigorous amount of rubbing or ageing, of a polish incorporating the same, will produce a sticky or hazy film.

The presence of one or more hydroxyl groups on the end of the molecule as in the mono and diricinoleates provides for greater immiscibility with petroleum hydrocarbons. At the same time, moreover, presence of these hydroxyl groups provide an increase in the affinity of the ricinoleates for water. This greater affinity for water results in a much more stable emulsion, in accordance with the widely accepted Langemuir-Harkins theory for emulsion of oils in water. The hydroxyl groups, that have been introduced by virtue of the formation of the mono and diricinoleates, are attracted to the water layer in much the same fashion as glycerine itself dissolves in water. On the other hand, the hydroxyl groups in castor oil are present in the fatty acid radical and while they produce greater immiscibility with petroleum hydrocarbons they do not have greater affinity for water.

The instant invention, therefore, involves a two-fold advantage over prior emulsion polishes:

First, it produces immiscibility or greater immiscibility of the polishing base oil with petroleum hydrocarbons, which means better polishing characteristics both in the ease of application and final result that is obtained;

Second, a more stable emulsion is obtained because of the position of the hydroxyl groups and the resulting greater affinity for water.

It is to be understood that the instant invention is not to be limited to the method illustrated above for preparing the mono or diglycerides for use as a polishing base oil in a three-phase emulsion polish, for other methods may be used to produce glycerides of fatty acids which may comprise, for example, re-acting the fatty acids with glycerine. However, for commercial reasons, and with most substances, the first mentioned methods are preferred and are more feasible.

An example of how three-phase emulsion polish can be made using glyceryl mono ricinoleate as a polishing base medium follows:

| | Parts |
|---|---|
| Mineral spirits | 169 |
| Light mineral oil | 187.5 |
| Glyceryl mono ricinoleate | 93.6 |
| Ricinoleic acid | 11.03 |
| Water | 624.75 |
| Water solution of potassium hydroxide containing 1.65 parts of potassium hydroxide | 19.25 |

A preferred method to be followed in mixing the ingredients is as follows: The potassium hydroxide solution and one-third of the total water are put in a mixing tank. The ricinoleic acid is then added and after the required stirring soap is formed by virtue of the action between the alkali and the fatty acid, the glyceryl mono ricinoleate is added followed by the mineral oil and in turn by one-half of the remaining water. Mineral spirits are added and finally the remaining water. The entire mixture after thorough agitation is then sent through an homogenizer to produce a commercial dispersion.

The mineral spirits function as a cleansing agent. Other cleansing agents may be substituted entirely or in part for the mineral spirits and such substances may be limited in nature and amount so that the substituted cleansing agent does not render the glyceryl mono ricinoleate miscible in the mineral oil.

The potassium ricinoleate soap formed from the ricinoleic acid and potassium hydroxide is used in an amount just sufficient to neutralize the ricinoleic acid. Other soaps and emulsifying agents, such as potassium oleate, tri-ethanol amine oleate, sodium stearate, etc., and the sulfated fatty alcohols could be just as advantageously employed. If the mono or diglyceride contains any quantity of soap as may be formed by virtue of the catalyst such as sodium hydroxide used, then that amount of soap may be subtracted from the quantity as formed in the above illustration. Thus it is possible to have the amount of soap or emulsifier necessary to produce a stable emulsion formed directly with the polish base oil and this oil when mixed with the petroleum hydrocarbons will produce the final emulsion when mixed with the required amount of water.

While the above formula serves as an example, still such substances as dyes, deodorants, and abrasive materials may be added. Also gums such as gum tragacanth, gum arabic, gelatin, and the like may be included as body-imparting agents or protective colloids to aid in maintaining or lengthening the stability of the polish emulsions. For example, to the basic formula, 1.687 parts of gum tragacanth may be added. The gum may be soaked in water overnight and when added produces a heavier bodied emulsion of increased stability.

It will be obvious to those skilled in the art that various changes may be made in the invention without departing from the spirit thereof, and therefore the invention is not limited to what is shown in the drawing and described in the specification, but only as indicated in the appended claims.

I claim:

1. A liquid polish adapted to be rubbed on a surface to be polished comprising a homogenized emulsion of the oil in water type of approximately the following composition:

| | Parts |
|---|---|
| Mineral spirits | 169 |
| Light mineral oil | 187.5 |
| Glyceryl mono ricinoleate | 93.6 | and a potassium ricinoleate soap emulsifying agent formed by the reaction of 11.03 parts of ricinoleic acid and 19.25 parts of water solution containing 1.65 parts of potassium hydroxide.

2. A liquid polish adapted to be rubbed on a surface to be polished comprising a three phase emulsion of a petroleum hydrocarbon lubricating medium as a discontinuous phase, a polishing base medium as a discontinuous phase, and water as a continuous phase, said polishing base consisting substantially entirely of at least one compound of the group consisting of monoglycerides and diglycerides of fatty acids, said compound being substantially immiscible with said lubricating medium and with said water.

3. A liquid polish adapted to be rubbed on a surface to be polished comprising a three phase emulsion of a petroleum hydrocarbon lubricating medium as a discontinuous phase, a polishing base medium as a discontinuous phase, and water as a continuous phase, said polishing base consisting substantially entirely of at least one compound of the group consisting of monoglyceride and diglyceride of ricinoleic acid, said compound being substantially immiscible with said lubricating medium and with said water.

LEROY W. SHUGER.